US009832175B2

(12) United States Patent
Chen et al.

(10) Patent No.: US 9,832,175 B2
(45) Date of Patent: Nov. 28, 2017

(54) GROUP MEMBER RECOVERY TECHNIQUES

(71) Applicant: Cisco Technology, Inc., San Jose, CA (US)

(72) Inventors: Lewis Chen, Hong Kong (CN); Scott Fluhrer, North Attleboro, MA (US); Warren Scott Wainner, Sterling, VA (US); Brian Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/230,924

(22) Filed: Aug. 8, 2016

(65) Prior Publication Data

US 2016/0344713 A1    Nov. 24, 2016

Related U.S. Application Data

(62) Division of application No. 14/248,399, filed on Apr. 9, 2014, now Pat. No. 9,444,796.

(51) Int. Cl.
*H04L 29/06*        (2006.01)

(52) U.S. Cl.
CPC ........ *H04L 63/061* (2013.01); *H04L 63/0272* (2013.01); *H04L 63/0428* (2013.01); *H04L 63/06* (2013.01); *H04L 63/104* (2013.01)

(58) Field of Classification Search
CPC .................................................... H04L 63/061
See application file for complete search history.

(56) References Cited

U.S. PATENT DOCUMENTS

| | | | |
|---|---|---|---|
| 5,848,067 A | 12/1998 | Osawa et al. | |
| 6,055,236 A | 4/2000 | Nessett et al. | |
| 7,234,063 B1 * | 6/2007 | Baugher | H04L 9/0833 380/259 |
| 7,400,733 B1 * | 7/2008 | Cam-Winget | H04L 63/06 380/270 |
| 7,426,636 B1 * | 9/2008 | McGrew | H04L 63/0272 713/160 |
| 7,434,045 B1 | 10/2008 | Enderwick et al. | |

(Continued)

OTHER PUBLICATIONS

Al-Humoud, Sarah O., Lewis M. Mackenzie, and Wim Vanderbauwhede, "Dynamic counter-based broadcast in MANETs." Proceedings of the 4th ACM workshop on Performance monitoring and measurement of heterogeneous wireless and wired networks. ACM, 2009.

*Primary Examiner* — Shawnchoy Rahman
(74) *Attorney, Agent, or Firm* — Edell, Shapiro & Finnan, LLC

(57) ABSTRACT

Techniques are presented for optimizing secure communications in a network. As disclosed herein, a key server is configured to provision a plurality of routers that are part of a virtual private network. The key server selects a counter value that is part of a security association and calculates a key value. The key server sends the key value, together with the security association, to the plurality of routers that are part of the virtual private network to enable them to exchange encrypted packets with each other in the virtual private network using the key value and the security association. The key server then increments the counter value to a value within a range of counter values capable of being predicted by the plurality of routers that received the key value.

18 Claims, 8 Drawing Sheets

(56) References Cited

U.S. PATENT DOCUMENTS

| | | | |
|---|---|---|---|
| 7,464,410 B1* | 12/2008 | Halasz | H04L 63/1416 |
| | | | 726/22 |
| 8,204,228 B2 | 6/2012 | Weis et al. | |
| 2002/0062344 A1 | 5/2002 | Ylonen et al. | |
| 2005/0138369 A1* | 6/2005 | Lebovitz | H04L 12/185 |
| | | | 713/163 |
| 2010/0046533 A1 | 2/2010 | Kuramoto et al. | |
| 2010/0246829 A1 | 9/2010 | McGrew et al. | |
| 2011/0164752 A1 | 7/2011 | Wainner et al. | |
| 2011/0182426 A1 | 7/2011 | Roosta et al. | |
| 2013/0036305 A1 | 2/2013 | Yadav et al. | |
| 2015/0295899 A1 | 10/2015 | Chen et al. | |

\* cited by examiner

GROUP MEMBER RECOVERY TECHNIQUES

CROSS REFERENCE TO RELATED APPLICATION

This application is a divisional of U.S. Non-provisional application Ser. No. 14/248,399, filed Apr. 9, 2014, the entirety of which is incorporated herein by reference.

TECHNICAL FIELD

The present disclosure relates to optimizing secure communications in networks.

BACKGROUND

Routers are deployed in network environments to manage and route communications between network devices. For example, a network device may send to a router a packet destined for another network device. The router may forward the packet to other routers in the network before the packet is ultimately sent to the destination network device. Network devices may be grouped in subnetworks that, for example, may represent enterprise networks. Network devices in one subnetwork may communicate with network devices in another subnetwork over a public network (e.g., the Internet). However, enterprise networks may require enhanced security for communications between local network devices and network devices in other subnetworks. Thus, the subnetworks communicate by way of a virtual private network (VPN) to enable secure and encrypted messages to be exchanged between network devices in different subnetworks over the Internet.

DESCRIPTION OF EXAMPLE EMBODIMENTS

Overview

Techniques are presented herein for optimizing secure communications in a network. A first router in a network receives from a second router in the network an encrypted packet. The encrypted packet has a security association that is unknown to the first router. The security association is in a header of the packet. The first router examines the packet to determine a counter value associated with the security association. The first router determines whether the counter value is in a range of predicted counter values.

Additionally, a key server is configured to provision routers that are part of a virtual private network. The key server selects a counter value that is part of a security association. The key server calculates a key value. The key server sends the key value together with the security association to the routers such that the routers are able to exchange encrypted packets with each other in the virtual private network using the key value and the security association. The key server increments the counter value to a value within a range of counter values capable of being predicted by the routers that received the key value.

Example Embodiments

Figure 1:
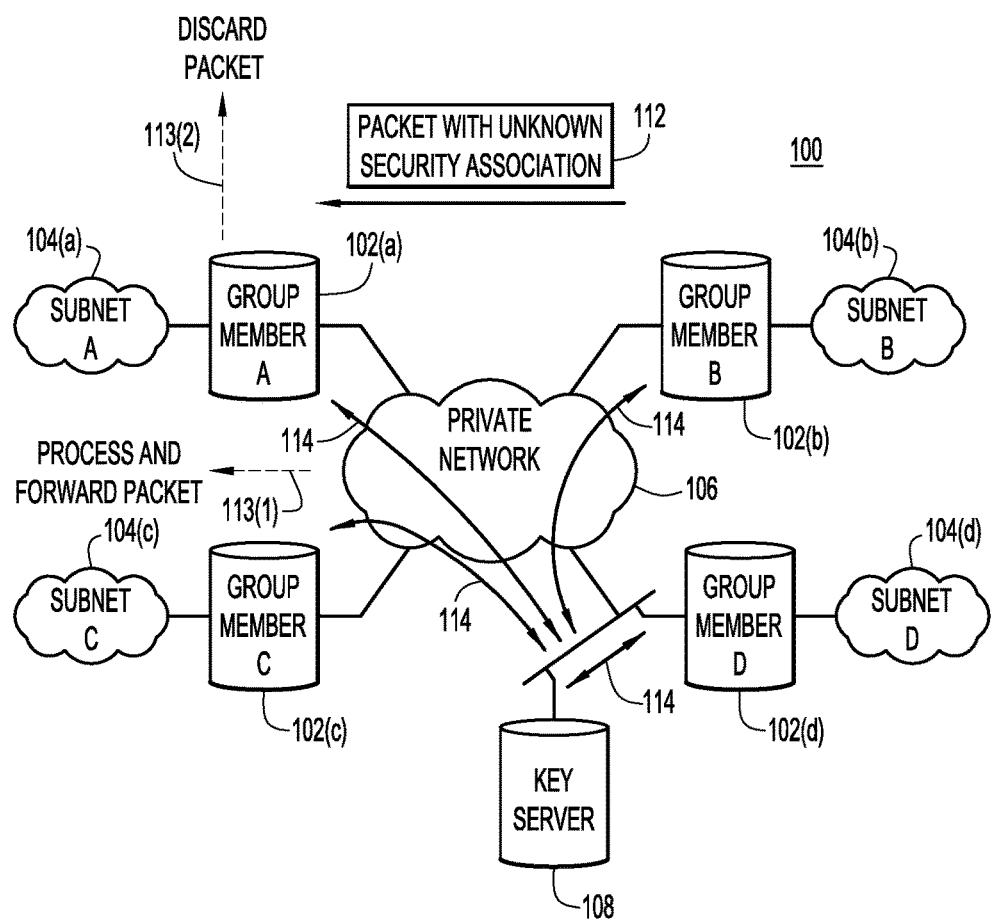
FIG. 1 shows an example network topology depicting a plurality routers arranged in in a private network to enable the routers to synchronize or resynchronize with a key server, according to an example embodiment.

The techniques presented herein relate to optimizing secure communications in a network. Specifically, these techniques enable router devices to synchronize and resynchronize with a key server in order to exchange secure communications with each other within the network. An example system topology ("system") is shown at reference numeral 100 in FIG. 1. The system 100 may also be referred to as a "network." The system 100 comprises a plurality of router devices ("routers") shown at reference numerals 102(a)-102(d), a plurality of subnetworks ("subnets") 104(a)-104(d), a service provider network ("private network") 106 and a key server 108. The service provider network, for example, may be a network that a customer joins, and packets from the customer that are transmitted in the service provider network are typically encrypted. The routers 102(a)-102(d) are devices that are configured to manage and route communications between network devices in the system 100. In particular, each of the routers 102(a)-102(d) is configured to route communications to and from network devices in corresponding subnetworks 104(a)-104(d). In FIG. 1, subnetwork 104(a) is also referred to as "subnetwork A" or "subnet A," subnetwork 104(b) is also referred to as "subnetwork B" or "subnet B," and so on. In an example, router 102(a) is configured to route communications to and from network devices in subnet A, router 102(b) is configured to route communications to and from network devices subnet B, router 102(c) is configured to route communications to and from network devices subnet C, and router 102(d) is configured to route communications to and from network devices subnet D. It should be appreciated that the network devices in the subnetworks 104(a)-104(d) are not shown in FIG. 1. It should be further appreciated that FIG. 1 may comprise any number of routers and subnetworks. The topology of system 100 in FIG. 1 is merely an example.

In addition to routing communications to and from corresponding subnetworks, the routers 102(a)-102(d) are configured to communicate with each other by way of the private network 106. The private network 106 enables network devices in one subnetwork to exchange secure and encrypted communications (e.g., packets) with network devices in other subnetworks via one or more of the routers 102(a)-102(d). For example, administrators of subnet A and subnet B may require that network devices in subnet A and subnet B exchange only secure and encrypted communications with each other. Thus, a client device in subnet B may send a packet to router 102(b), and the router 102(b) may encapsulate the packet to ensure that the packet is encrypted and secure. Router 102(b) may then send the packet to router 102(a) across the private network 106. Router 102(a), upon receiving the encrypted packet, may decapsulate the packet and send it to the appropriate destination network device in subnet A. The private network 106 may also be referred to as a virtual private network (VPN). In one example, as shown in FIG. 1, router 102(a) may receive a packet 112 with an unknown security association. Router 102(a) may analyze the packet 112 and take an appropriate corrective action. For example, as shown at 113(1) router 102(a) may process the packet 112 and forward it to the appropriate destination network device in subnet A. On the other hand, as shown at 113(2), router 102(a) may discard the packet 112. These techniques are described in more detail hereinafter.

The routers 102(a)-102(d) are also configured to exchange communications with the key server 108 across the private network 106. These communications are shown at reference numeral 114 in FIG. 1. The key server 108 is a device (or process) that periodically generates and distributes cryptographic keys ("keys") to the routers 102(a)-102(d). These keys comprise keying materials and policies that may be shared between multiple routers. For example, the keys may have security associations (or SAs) that are shared security attributes that the key server 108 can provide to multiple routers. The SAs can contain, e.g., a simple set of policies and associated keys or policies that specify the use of related keying materials using a key generation system. In one example, the key server 108 is configured to obtain security policy information that describes which routers in the system 100 are to become members of the same VPN. The key server 108 uses the cryptographic keys to define router devices to be members of a VPN. For example, the key server 108 sends the same cryptographic keys, with the shared SAs, to the routers that are part of the same VPN. The key server 108 may periodically distribute a group key to all of the routers that are determined to become members of a same VPN. In other words, the key server 108 may send the same cryptographic keys comprising shared SAs to each of the routers that are part of the same VPN.

In FIG. 1, the routers 102(a)-102(d) are part of the same VPN, and thus, the routers 102(a)-102(d) receive from the key server 108 the same group key comprising the same shared SAs. Thus, upon receiving the same group key, the routers 102(a)-102(d) are said to be synchronized with each other. After the routers 102(a)-102(d) are synchronized, they can exchange secure and encrypted communications with each other. The key server 108 may distribute a different group key to other routers (not shown) in the system 100 to create another VPN group. Likewise, the key server 108 may distribute a different group key to some but not all of the routers 102(a)-102(d) to create a different VPN, such that these routers may be members of both the private network 106 shown in FIG. 1 and another VPN.

Routers that are part of the same VPN are referred to as "group members" of the VPN. As stated above, in FIG. 1, routers 102(a)-102(d) are group members of the same VPN (i.e., private network 106). Router 102(a) may be referred to as "group member A" or "GM A," router 102(b) may be referred to as "group member B" or "GM B," and so on. Group members are also referred to as peer routers, and for example, GM A, GM B, GM C and GM D are all group peer routers. For example, GM A receives a packet from a network device in subnet A and encrypts the packet by encapsulating it in a format that is capable of being decapsulated by other group members (e.g., GM B, GM C and GM D). GM A then sends the encapsulated packet to the appropriate router in the VPN (private network 106) to be decapsulated and sent to the destination network device in another subnetwork. Likewise, upon receiving an encapsulated packet from another group member in the VPN, GM A can decapsulate the packet and send the decapsulated packet to the appropriate destination network device in subnet A. Thus, the GM A is said to "protect" network devices in subnet A, since GM A ensures that packets sent by the network devices in subnet A are securely transmitted to other group members in the VPN. Similarly, GM B protects network devices in subnet B, GM C protects network devices in subnet C, and GM D protects network devices in subnet D.

The key server 108 may distribute the keys to the group members using, e.g., key exchanges described by the Internet Key Exchange (IKE) protocol. In one example, the IKE protocol is described in the Request for Comments (RFC) 2409 by the Internet Engineering Task Force (IETF). Furthermore, IETF RFC 6407 describes a Group Domain of Interpretation (GDOI) protocol for techniques of a key server distributing a group key to group members. These protocols are merely examples, and other group key distribution protocols known or contemplated may be used to enable the key server 108 to distribute group keys to group members of a VPN.

Once the routers 102(a)-102(d) have received the group key from the key server 108, and upon the key server 108 authenticating each router, the routers 102(a)-102(d) are admitted as group members to the VPN. The group members are configured to exchange encrypted traffic with each other using the group key received from the key server 108. However, membership to a VPN can change over time, and the key server 108 may periodically send new group keys with new SAs to the group members to ensure their membership in a VPN. For example, each key that is sent by the key server 108 to the group members may have an expiration lifetime. In order to remain as group members to a VPN, routers need to obtain new keys from the key server 108. After the key expires, group members of a VPN will not be able to exchange communications with each other using the expired key, since the group members will be unable to perform encryption and decryption operation on the packets exchanged between each other. Thus, in order to remain as group members to a VPN, it is important that the routers receive valid (e.g., "unexpired") keys with valid SAs from the key server 108.

Thus, as state above, the key server 108 may periodically monitor membership of a VPN and may send new keys periodically to group members of a VPN. Group members that receive these periodic new group keys ("rekeys") remain as members of the VPN. The key server 108 can add other routers to the VPN by sending the rekey to the other routers, and likewise, the key server 108 may drop routers from the VPN by not sending the rekey. Thus, by sending the group key to the routers 102(a)-102(d), the key server 108 defines a group VPN, in which the routers 102(a)-102(d) are group members of a fully-meshed VPN with any-to-any connectivity between the routers.

As a group VPN scales and as more routers are added as group members to the group VPN, the likelihood increases that the group members of a group VPN may become unsynchronized. For example, as the key server 108 sends rekeys to the group member of the group VPN, some or all of the group members may not receive the rekey information. As a result, the group members that do not receive the rekey information may not be able to exchange encrypted and secure communications with group members that do receive the rekey information. Although the key server 108 will typically attempt to deliver missed rekeys several times, network congestion conditions (such as high network congestion) may prevent one or more group members from receiving the rekeys. There may be several example scenarios where one or more group members do not receive the rekeys. These examples include, but are not limited to, general network outages (e.g., if a router has crashed or if a network link fails), an operator inserted firewall or access control list blocking rekeys, routing protocols that are corrupted during a rekey, mobile and/or wireless router disconnection from the network during rekey, etc.

Typically, the key server 108 sends rekeys for group members of a VPN when the SAs in the previous keys are near expiration. Thus, group members can detect whether or not it has missed an expected rekey by examining the lifetime of the SAs associated with its current key. For example, if the SAs of a key are about to expire or have recently expired, and if a group member has not received a rekey, the group member can reasonably infer that it has missed a rekey from the key server 108. As a result, the group member can send a key request message to the key server 108 to obtain the rekey (with the new SAs), and if it is appropriate for the key server 108 to send the rekey to the group member (i.e., if the group member is still part of the VPN), the key server 108 will respond to the key request message by sending the rekey to the group member.

However, in other scenarios where a rekey is sent not in response to the SAs of the previous keys expiring, but rather in response to other rekey trigger events, a group member may not be able to determine or realize that it has missed a rekey from the key server 108. For example, the group member may not be able to infer that it missed a rekey by simply evaluating the lifetime of the SAs associated with its current key, since the rekey event may not be triggered by the expiration of the SAs. Additionally, network conditions (such as network outages) may result in multiple key servers cooperating to provide keying services. This situation may result in multiple SAs being sent to group members of a VPN, but due to network outages, some of the group members may not receive the SAs.

The techniques described herein alleviate these drawbacks by enabling a group member to determine whether or not it has missed a rekey and to resynchronize with the other group members upon determining that it has missed a rekey. Additionally, the techniques described herein enable a group member to respond appropriately to receiving a packet with SAs unknown to it. For simplicity, these techniques are described in reference to private network 106 a the VPN and routers 104(*a*)-104(*d*) as group members of the VPN.

As stated above, the VPN may be a private network within a public network such as the Internet, and thus, after joining as group members to the VPN, the routers 104(*a*)-104(*d*) may exchange encrypted communications in accordance with public exchange protocols. In other words, the routers 104(*a*)-104(*d*) may exchange communications with each other by encapsulating packets of public exchange protocols. For example, router 104(*b*) may send a packet to router 104(*a*) in the VPN by encapsulating the packet with information related to the shared SAs received by the group members from the key server 108. In one example, a network device in subnet B may send to GM B an IP packet destined for a network device in subnet A. It should be appreciated that the techniques described herein are applicable to any public exchange protocol, and IP exchanges is used as an example. GM B, upon receiving the packet, encapsulates the IP packet with an outer header and encryption information in accordance with the parameters set by the key server 108 during the latest key exchange with GM B. For example, GM B may encapsulate the packet with Security Parameter Index (SPI) value that is associated with the SAs of the latest key exchange between GM B and the key server 108 associated with the VPN. In one example, GM B may encapsulate the IP packet such that the IP packet is now delivered to GM A in the VPN as a secure and encrypted Internet Protocol Security (IPSec) packet.

GM A receives the encapsulated IPSec packet, and since GM A is part of the same VPN group and is provisioned with the same key information as GM B, GM A recognizes the SPI value and thus is able to decapsulate the packet and delivers the underlying IP packet to the network device in subnet A. Since the IP packet is encapsulated by GM B, if an intermediate router in the network path between GM B and GM A receives the packet, the intermediate router in the network path would not be able to decapsulate the encapsulated IP packet, because the intermediate router does not recognize the SPI value since it is not part of the same VPN group as GM A and GM B. Thus, the network path between GM B and GM A may utilize public routers to forward the encapsulated IP packet, but only specific group member routers are able to decapsulate the encapsulated IP packet. It should be appreciated that the term "SPI value" may also be referred to as a "key value."

However, as shown in FIG. 1, there may be scenarios when GM A does not recognize the SPI value of the encapsulated packet sent by GM B. For example, as described above, even though GM A and GM B are part of the same VPN, GM A may have missed a rekey provided by the key server 108. Thus, GM B encapsulates the packet with an SPI value associated with SAs of the new rekey that are unknown to GM A. Thus, GM A receives the packet 112 shown in FIG. 1, but since GM A did not receive the rekey, GM A does not recognize the SPI value associated with the SAs of the rekey. The techniques herein enable GM A to determine whether or not it should recognize the SPI value, and if so, what corrective actions to take. Additionally, the techniques herein enable the key server 108 to select SPI values associated with SAs of rekeys such that the group members can detect whether or not the SPI values should be known to them.

In general, SPI values are generated by the key server 108, and as a result, the key server 108 can choose appropriate SPI values when sending keys and rekeys to group members of the VPN. For example, the key server 108 may choose a predetermined range of SPI values (e.g., 1000-2000) for use within a particular VPN, but this strategy has a number of drawbacks. First, it is operationally inefficient to reserve a number of SPI values that may not be used. Additionally, under this approach, false-positives are difficult to detect, and since SPI values are not chosen over an entire bit sequence (e.g., a 32-bit SPI sequence), it may be easier for third parties to spoof the SPI values to exchange packets to the group members in the VPN.

The techniques described herein enable to key server 108 to optimize selection of the SPI values. In general, according to the techniques herein, the key server 108 generates SPIs from a fixed-size counter (e.g., using a block cipher), the details of which the group members are aware. For example, the fixed-size counter (e.g., referred to as "fixed value" or "K") may be associated with a public key (e.g., a Rivest- Shamir-Adleman (RSA) public key) known to all of the group members of the VPN and the key server 108. When a group member receives a packet with an unknown SPI value, the group member reverses the SPI generation process to recover a possible counter value (e.g., referred to as "counter value" or "C"). The group member can then determine whether or not the counter value C is within a range of acceptable counter values. The range of acceptable counter values is also referred to herein as a range of predicted counter values. The range of acceptable values is known to the group member based on information in the fixed value. For example, the range of acceptable values may be sent to the group members as a part of a group policy. For example, the group members may receive a maximum size value for the range as the number of bits in the counter (e.g., 16 bits with a max size of 65535, with a range between 0 and 65535 (i.e., 0 to $2^{16}$)). It should be appreciated that the range may be between 0 to the maximum size value or may be any number n to the maximum size value, where the number n may also be provided to the group members. In another example, the range of acceptable values may be determined by the group members by the group members evaluating hard-coded information. If the counter value is within the range of acceptable values defined by the fixed value, the group member determines that the SPI value may be a valid SPI value for the VPN. The group member can then take an appropriate corrective action. If the counter value is not within the range of acceptable values, the group member determines that the SPI value is not valid, and thus, the group member may discard the packet.

Figure 2:
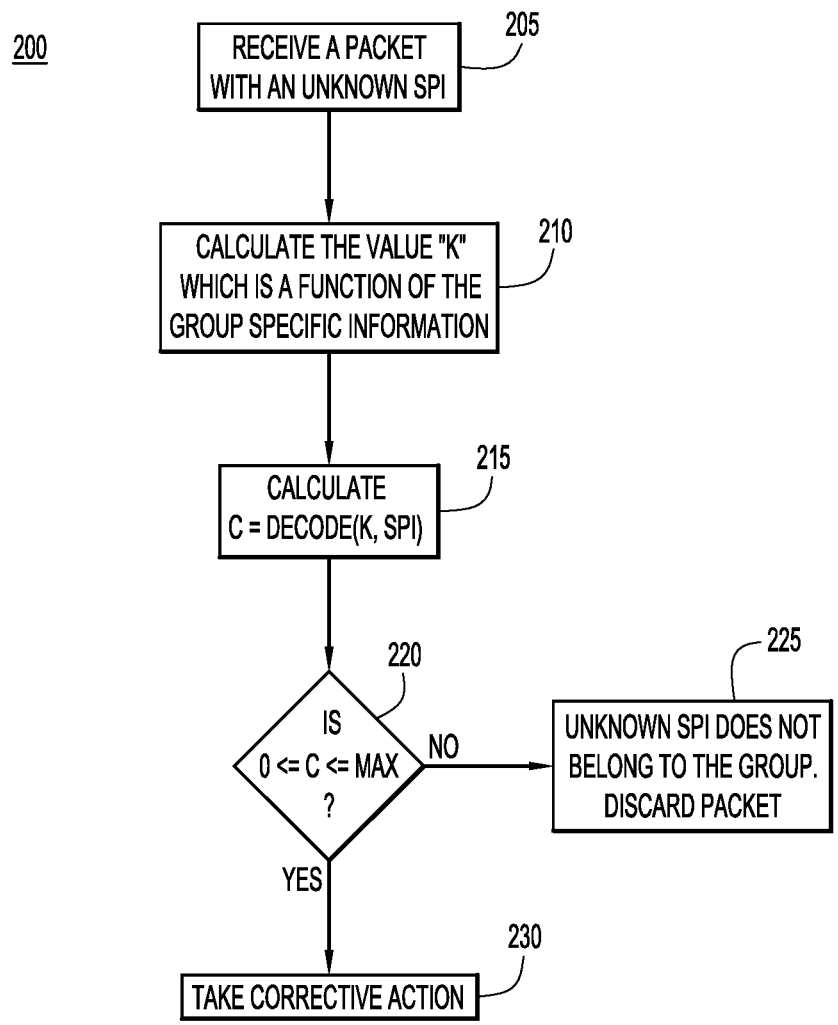
FIG. 2 shows an example flow chart depicting operations of a router receiving a packet with unknown security parameter information, according to an example embodiment.

Reference is now made to FIG. 2. FIG. 2 shows an example flow chart 200 depicting operations of GM A receiving the packet 112 with an unknown SPI. At operation 205 in the flow chart 200, GM A receives a packet with an unknown SPI value (e.g., packet 112 in FIG. 1). The packet 112 is encapsulated and sent to GM A by another group member of the VPN (e.g., GM B). At 210, GM A calculates the fixed value K. As stated above, the fixed value K is a function of group specific information, and thus, the value K is known to all of the group members of the VPN. For example GM A may receive the fixed value K as a part of a group policy. In another example, GM A may derive the fixed value K from some other piece of group policy previously received (e.g., from the RSA public key). After GM A calculates the fixed value K, GM A, at operation 215, determines the counter value C by reversing the SPI generation process. For example, GM A performs a decoding operation to determine the counter value C. At 220, GM A determines whether or not the counter value C from operation 215 is within an acceptable range of counter values. If the counter value C is not within an acceptable range of counter values, GM A, at 225, determines that SPI value in the packet 112 does not belong to the VPN, and accordingly, GM A discards the packet. GM A may store this value in a database for future reference, such that if GM A receives another packet with the same unknown SPI value, GM A can immediately determine that the SPI value does not belong to the VPN. An example database of the SPI values is shown below in Table 1.

TABLE 1

SPI value database maintained by group member

| SPI Value | Number of appearances |
|---|---|
| xxxx . . . 1 | 3 |
| xxxx . . . 2 | 1 |
| xxxx . . . 3 | 8 |

As shown in Table 1, GM A may maintain a database that stores the SPI value and indicates a number of times that GM A has previously received packets that have the given SPI value. It should be appreciated that there may be other fields in the SPI value database. For example, the SPI value database may comprise policy information associated with each SPI value that indicates what corrective action, if any, was taken by GM A upon receiving a packet with a particular SPI value.

If the counter value C is within the acceptable range of counter values, GM A, at operation 230, may take corrective action. For example, GM A may determine that the SPI value in the packet 112 is part of the VPN, and accordingly, GM A may forward the packet 112 without decapsulating it in case that the SPI value in the packet 112 is a false positive (i.e., the SPI decodes to an acceptable counter value, but was not generated by the key server 108). GM A may also discard the packet. GM A may also assume that it missed a rekey from the key server 108. GM A may then send a key request message to the key server 108 to obtain a rekey that was missed by GM A. Alternatively, GM A may store the SPI value in a database and register with the key server 108 only after it receives several more packets with the same SPI. After GM A receives a predetermined number of packets with the same SPI value, GM A may then register with the key server 108 to obtain the current policy and associated keys.

Figure 3:
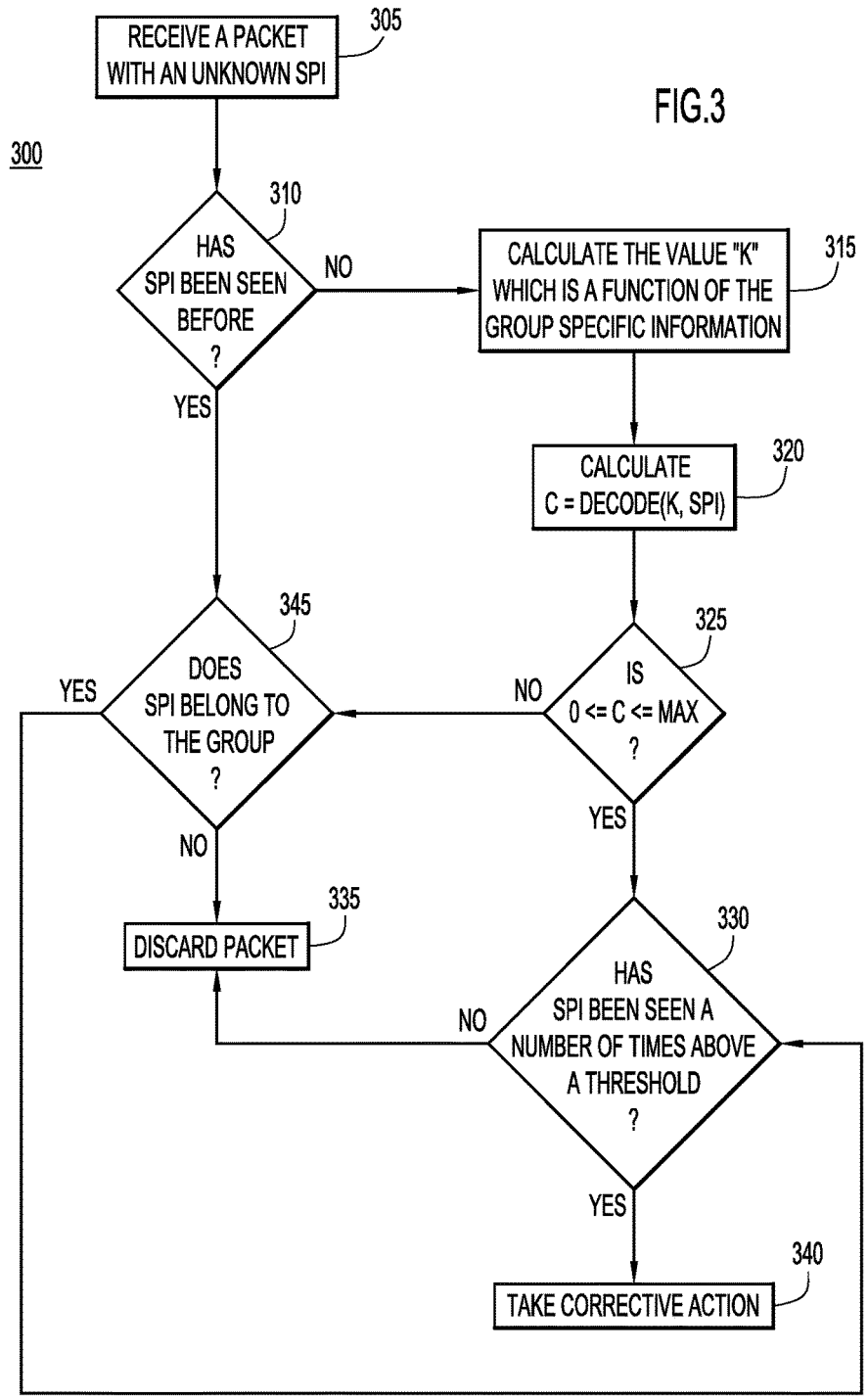
FIG. 3 shows an example flow chart depicting operations of the router resynchronizing in response to receiving multiple packets with unknown security parameter information, according to an example embodiment.

Reference is now made to FIG. 3, which shows an example flow chart 300 depicting operations of GM A resynchronizing in response to receiving multiple packets with unknown SPIs. At operation 305, GM A receives the packet 112 with an unknown SPI value. At 310, GM A determines whether or not it has received a previous packet with the same SPI value. For example, GM A may perform a lookup in the SPI database (e.g., shown in Table 1, above) to determine whether or not it received a previous packet with the same SPI value as packet 112. If GM A has not received a previous packet with the same SPI value, GM A, at 315, calculates the fixed value K. As stated above, the fixed value K is a function of the VPN that is available to all of the group members and the key server 108, and from the fixed value K, GM A can determine an acceptable range of counter values. At 320, GM A determines a counter value C from the unknown SPI value by reversing the SPI generation process. For example, GM A uses the fixed value K and the SPI value to decode the SPI generation process to obtain the counter value C.

At 325, GM A determines whether or not the counter value C determined in operation 320 is within an acceptable range of counter values. If so, at 330, GM A determines a number of times that it has received packets with the same SPI value and if the number of times exceeds a predetermined threshold. If the number of packets previously received by GM A is below the predetermined threshold, then at operation 335, GM A ignores the packet (e.g., discards it). In this example, it should be appreciated that the predetermined threshold may be any number (including zero) and thus, the predetermined threshold may be exceeded at the first time GM A receives the packet. If the number of packets previously received by GM A is above the predetermined threshold, GM A, at operation 340 takes corrective action, including, for example, processing the packet and sending a request to the key server 108 for a rekey, as described above.

If however, the counter value C determined in operation 320 is not in an acceptable range (i.e., if the answer to operation 325 is "no"), GM A will ignore the packet and discard it, as described in operation 335. Furthermore, if GM A has previously received a packet with the same SPI value as packet 112 (i.e., if the answer to operation 310 is "yes"), GM A then determines, at 345, whether or not the SPI belongs to the VPN. For example, GM A may store in its database information as to whether or not an SPI value was determined to belong to the VPN (e.g., whether or not the SPI value has a determined counter value C that is within the acceptable range of counter values). If the SPI does not belong to the VPN (i.e., if the answer to operation 345 is "no"), GM A will ignore the packet and discard it, as described in operation 335. If the SPI does belong to the VPN, GM A will revert to operation 330 to determine the number of times that it has received packets with the same SPI value. Thus, GM A is able to determine intelligently whether or not to discard or process and forward encrypted packets with unknown SPI values.

Figure 4:
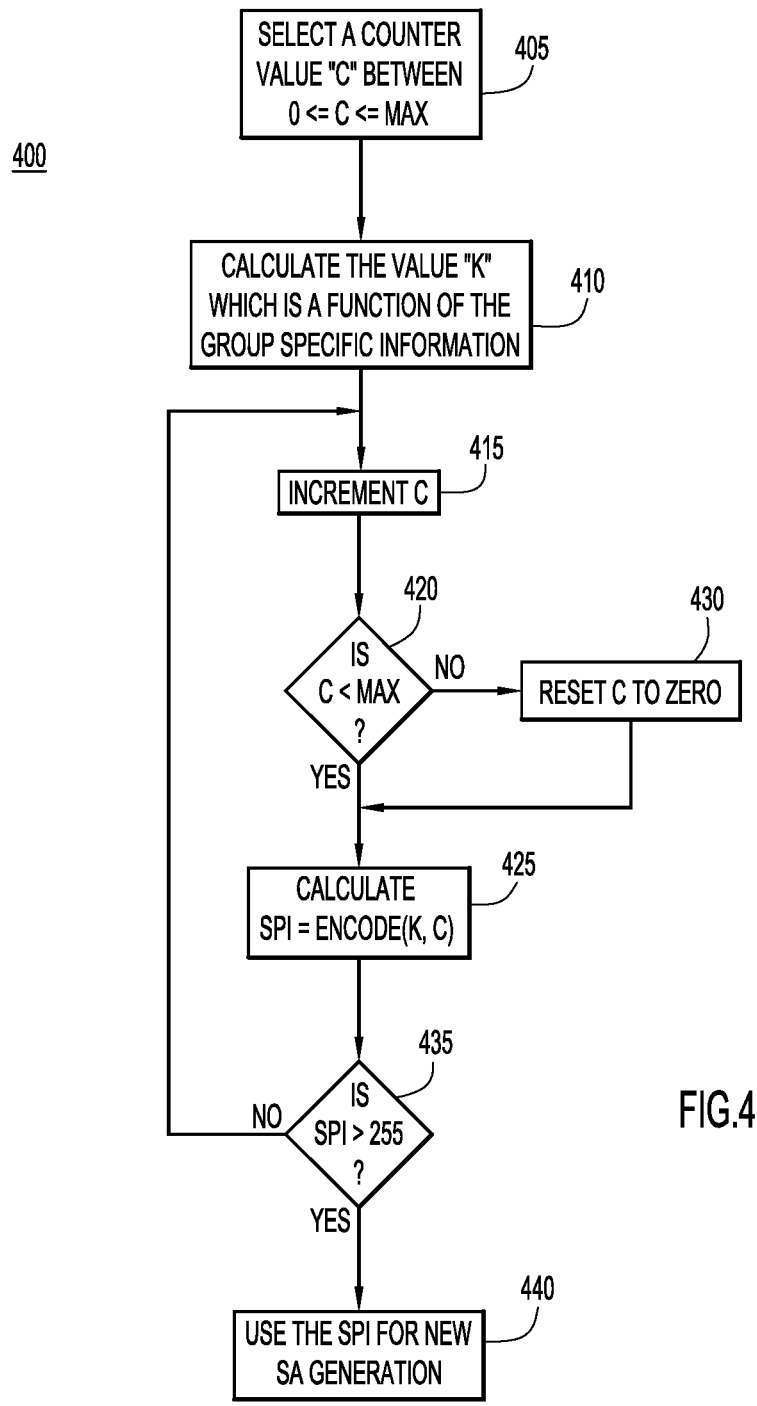
FIG. 4 shows an example flow chart depicting operations of a key server selecting security parameter information values based upon generated security associations for the routers, according to an example embodiment.

Reference is now made to FIG. 4. FIG. 4 shows an example flow chart 400 depicting operations of the key server 108 selecting SPI values upon generating SAs for the group members. In particular, the flow chart 400 in FIG. 4 describes operations for the key server 108 to select SPI values that can be recognized by group members as being valid SPI values, even when the group members do not receive keys or rekeys from the key server 108. At 405, the key server 108 selects a counter value C between an acceptable range of counter values. The key server 108, at 410, then calculates the fixed value K, which is a function of the specific VPN that the key server 108 is provisioning. At operation 415, the key sever 108 increments the counter value C, and at 420, determines whether or not the incremented counter value C has a value that is lower than the maximum allowable counter value defined by the acceptable range of counter values. If the incremented counter value C is lower than the maximum allowable counter value, at 425, the key server 108 calculates the SPI value. The SPI values are calculated, for example, by performing an encoding operation using the incremented counter value C and the fixed value K. In one example, the encoding operation is a 32 bit block cipher operation, and the counter value C is a 16 bit variable (e.g., with $2^6$ or 16,536 possible values). Thus, if the counter value C is 16,535 before being incremented, the counter value C will increment to a value of zero. In one example, the SPI value must be a value that is greater than 255, though it should be appreciated that this is merely an example.

After calculating the SPI value in operation 425, the key server 108, at operation 435, determines whether or not the SPI value is greater than a predetermined number (e.g., 255). If so, the key server 108 uses the SPI value for the SAs generated for the keys/rekeys to be distributed to the group members. If, however, the SPI value is greater than a predetermined number (i.e., if the answer to operation 435 is "no"), the key server reverts to operation 415, and increments the counter value C. Additionally, if the incremented counter value is ever greater than the acceptable maximum value (i.e., if the answer to operation 420 is "no"), the counter value is reset to zero, and the key server 108 calculates the SPI value, as described in connection with operation 435.

It is important that a key server select an SPI value that reduces the likelihood of a group member detecting a false-positive SPI value from the above-described analysis. For example, it is important to minimize the likelihood that a group member will determine that an SPI value was generated by the key server 108, when it fact it may be a spoof. Thus, as shown in Table 2, false-positives can be minimized by using an appropriately sized counter value C.

TABLE 2

False-positive rates for different counter value bit sizes

| Counter value bit size | SPI space | Accuracy | False-positive rate |
|---|---|---|---|
| 24 | 16.777M (i.e., $2^{24}$) | 99.60947% | 1 in 256 invalid SPIs |
| 20 | 1.048M (i.e., $2^{20}$) | 99.97559% | 1 in 4096 invalid SPIs |
| 16 | 65536 (i.e., $2^{16}$) | 99.99847% | 1 in 65536 invalid SPIs |

As shown, a 16 bit size for the counter value C provides adequate protection against false-positives while also allowing for a sufficiently large number of SPI values.

Figure 5:
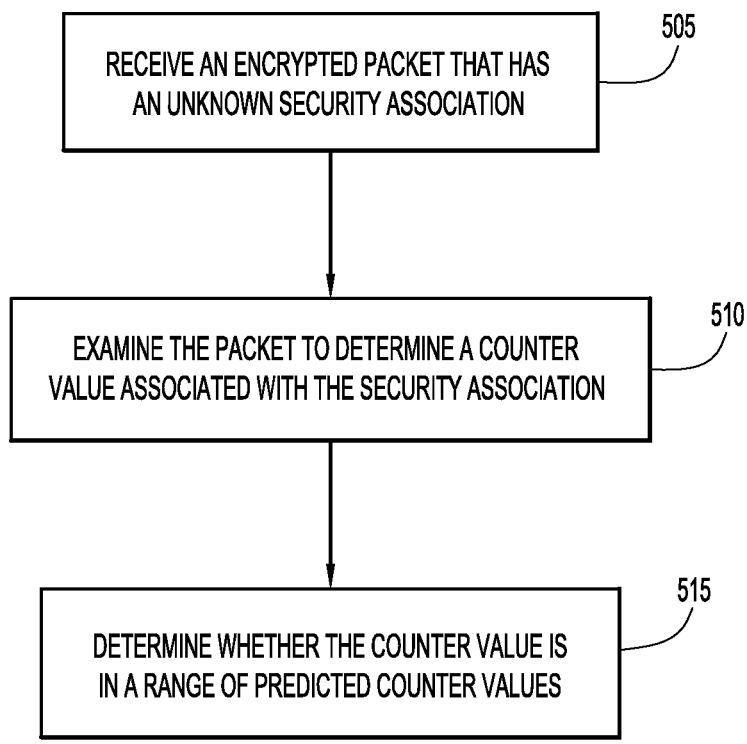
FIG. 5 shows an example flow chart depicting operations performed by the router in response to receiving packets with unknown security parameter information, according to an example embodiment.

Reference is now made to FIG. 5. FIG. 5 shows an example flow chart 500 depicting operations performed by the router in response to receiving packets with unknown SPI values. At operation 505, a first router in a network (e.g., GM A) receives from a second router in the network (e.g., GM B) an encrypted packet that has a security association (e.g., SPI value) unknown to the first router in a header of the packet. The first router, at 510, examines the packet to determine a counter value associated with the security association. At 515, the first router determines whether the counter value is in a range of predicted counter values.

Figure 6:
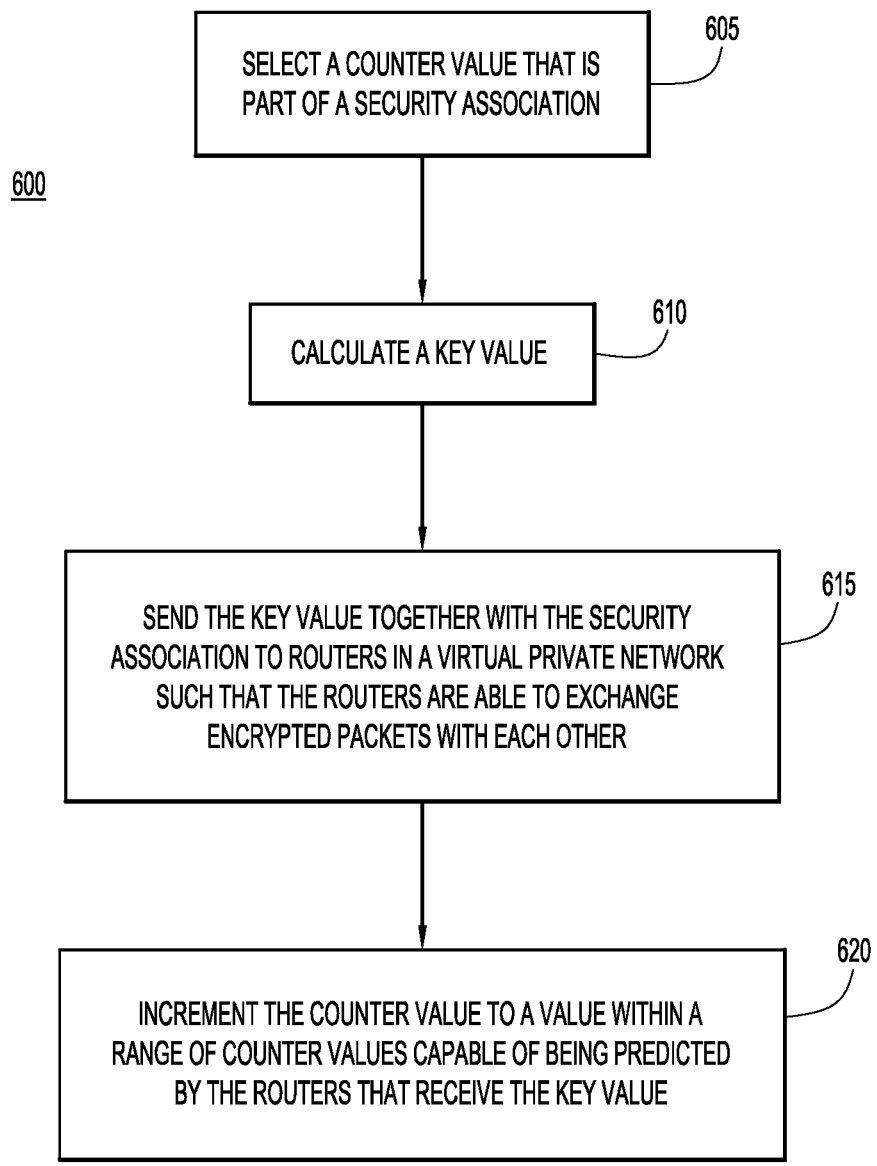
FIG. 6 shows an example flow chart depicting operations performed by the key server to provision the routers in the private network, according to an example embodiment.

Reference is now made to FIG. 6. FIG. 6 shows an example flow chart 600 depicting operations performed by the key server 108 to provision routers. At 605, the key server 108 selects a counter value that is part of a security association. The key server 108, calculates a key value at 610 and, at 615, sends the key value together with the security association to routers in a virtual private network such that the routers are able to exchange encrypted packets with each other in the virtual private network using the key value and security association. At 620, the key server 108 increments the counter value to a value within a range of counter values capable of being predicted by the routers that receive the key value.

Figure 7:
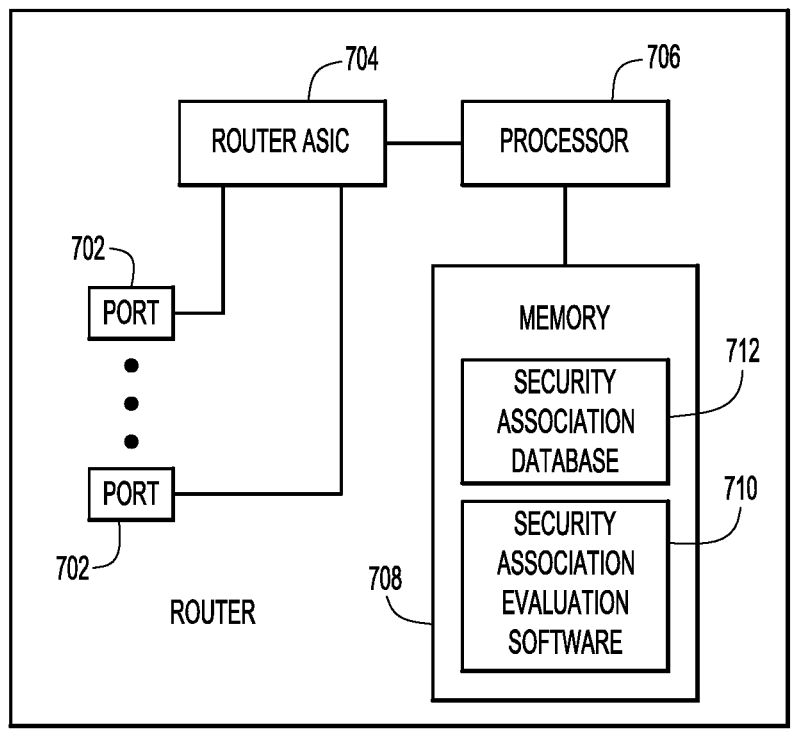
FIG. 7 shows an example block diagram of the router configured to perform synchronization or resynchronization operations with the key server in response to receiving packets with unknown security parameter information, according to an example embodiment.

Reference is now made to FIG. 7. FIG. 7 shows an example block diagram of a router 102 configured to encapsulate a packet received from a network device in a subnetwork protected by the router and to modify the outer header of the encapsulated packet. It should be appreciated that the router 102 in FIG. 7 may be any of the group member routers 102(a)-102(d). For simplicity, the router in FIG. 7 is referred to generally as router 102. The router device 102 comprises, among other components, a plurality of port units 702, a router application specific integrated circuit (ASIC) 704, a processor 706 and a memory 708. The ports 702 receive communications (e.g., packets) from network devices and are configured to send communications to network devices. The ports 702 are coupled to the router ASIC 704. The router ASIC 704 receives instructions from the processor 706 and forwards packets to appropriate port units 702 for transmission to a destination network device. The router ASIC 704 is coupled to the processor 706. The processor 706 is, for example, a microprocessor or microcontroller that is configured to execute program logic instructions (i.e., software) for carrying out various operations and tasks of the router 102, as described above. For example, the processor 706 is configured to execute security association evaluation software 710 according to the techniques described above. The security association evaluation software 710 also instructs the processor to maintain and update a security association database 712 (e.g., SPI value database) as described herein. The functions of the processor 706 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 708 may comprise read only memory (ROM), random access memory (RAM), magnetic disk storage media devices, optical storage media devices, flash memory devices, electrical, optical, or other physical/tangible (non-transitory) memory storage devices. The memory 708 stores software instructions for the security association evaluation software 710. The memory 708 also stores the security association database 712. Thus, in general, the memory 708 may comprise one or more computer readable storage media (e.g., a memory storage device) encoded with software comprising computer executable instructions and when the software is executed (e.g., by the processor 706) it is operable to perform the operations described for the security association evaluation software 710.

The security association evaluation software 710 may take any of a variety of forms, so as to be encoded in one or more tangible computer readable memory media or storage device for execution, such as fixed logic or programmable logic (e.g., software/computer instructions executed by a processor), and the processor 706 may be an ASIC that comprises fixed digital logic, or a combination thereof.

For example, the processor 706 may be embodied by digital logic gates in a fixed or programmable digital logic integrated circuit, which digital logic gates are configured to perform the security association evaluation software 710. In general, the security association evaluation software 710 may be embodied in one or more computer readable storage media encoded with software comprising computer executable instructions and when the software is executed operable to perform the operations described hereinafter.

Figure 8:
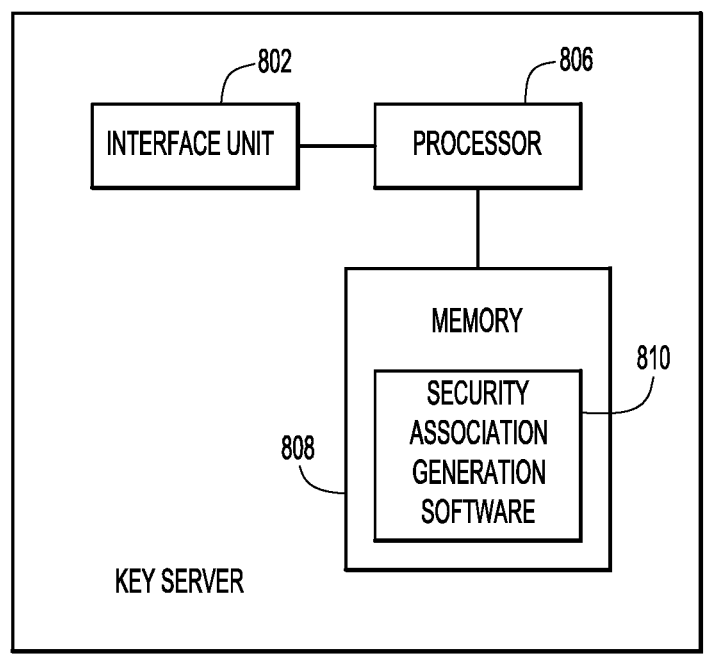
FIG. 8 shows an example block diagram of the key server, according to an example embodiment.

Reference is now made to FIG. 8. FIG. 8 shows an example block diagram of the key server 108. The key server has an interface unit 802, a processor 806 and a memory 808. The interface unit 802 is configured to send and receive messages (e.g., keys and rekeys) to the routers 102(a)-102(d). The interface unit is coupled to the processor 806. The processor is substantially similar to processor 706 described in connection with FIG. 7. In particular, the processor 806 is configured to execute security association generation software 810 to generate security associations and keying information, as described herein. The security association generation software 810 is stored in memory 808. The memory 808 may comprise a substantially same form as the memory 708 described in connection with FIG. 7. Likewise, the security association generation software 810 may comprise a substantially same form as the security association evaluation software 710 in described in connection with FIG. 7.

It should be appreciated that the techniques described above in connection with all embodiments may be performed by one or more computer readable storage media that is encoded with software comprising computer executable instructions to perform the methods and steps described herein. For example, the operations performed by the routers, key server and network devices may be performed by one or more computer or machine readable storage media (non-transitory) or device executed by a processor and comprising software, hardware or a combination of software and hardware to perform the techniques described herein.

In summary, a method is provided comprising: at a first router in a network, receiving from a second router in the network an encrypted packet that has a security association unknown to the first router in a header of the packet; examining the packet to determine a counter value associated with the security association; and determining whether the counter value is in a range of predicted counter values.

In addition, a method is provided comprising: at a first router in a network, receiving from a second router in the network an encrypted packet that has a security association unknown to the first router in a header of the packet; examining the packet to determine a counter value associated with the security association; and determining whether the counter value is in a range of predicted counter values.

Furthermore, an apparatus is provided comprising: a plurality of ports configured to send and receive messages in a network; and a processor coupled to the ports, and configured to: receive from a router in the network an encrypted packet that has an unknown security association apparatus in a header of the packet; examine the packet to determine a counter value associated with the security association; and determine whether the counter value is in a range of predicted counter values.

The above description is intended by way of example only. Various modifications and structural changes may be made therein without departing from the scope of the concepts described herein and within the scope and range of equivalents of the claims.

What is claimed is:

1. A method comprising:
   at a key server configured to provision a plurality of routers that are part of a virtual private network, selecting a counter value that is part of a security association, wherein the counter value is selected from a range of counter values and a maximum size value of the range of counter values is based on a number of bits in the counter value;
   determining whether the counter value is lower than the maximum size value;
   in response to determining that the counter value is lower than the maximum size value, determining a Security Parameter Index ("SPI") value as a key value;
   sending the key value together with the security association to the plurality of routers such that the plurality of routers are able to exchange encrypted packets with each other in the virtual private network using the key value and the security association; and
   incrementing the counter value to a value within a range of counter values capable of being predicted by the plurality of routers that receive the key value.

2. The method of claim 1, wherein sending comprises sending the key value to one or more of the plurality of routers that is part of the virtual private network to enable at least one router that is part of the virtual private network, but that has not received the key value, to determine the key value.

3. The method of claim 1, further comprising sending an updated security association with the incremented counter value to the plurality of routers that are part of the virtual private network.

4. The method of claim 3, further comprising:
   receiving a request from one or more of the plurality of routers for the updated security association; and
   providing the updated security association to the one or more of the plurality of routers in response to the request.

5. The method of claim 1, wherein determining an SPI value further comprises selecting an SPI value that reduces the likelihood that a group member associated with the plurality of routers will detect a false-positive SPI value.

6. The method of claim 1, wherein determining an SPI value further comprises performing an encoding operation using the counter value and a fixed value that is a function of a value associated with the virtual private network.

7. The method of claim 6, wherein the encoding operation is a block cipher operation.

8. The method of claim 1, further comprising:
determining whether the SPI value is greater than a predetermined number; and
if it is determined that the SPI value is greater than the predetermined number, associating the SPI value with the security association.

9. The method of claim 8, further comprising:
if it is determined that the SPI value is less than or equal to the predetermined number, incrementing the counter value; and
determining whether the counter value is greater than the maximum size value, and if so, resetting the counter value to zero.

10. The method of claim 1, wherein sending comprises sending the key value together with the security association to the plurality of routers using an Internet Key Exchange ("IKE") protocol.

11. An apparatus comprising:
a network interface unit configured to send and receive messages in a network; and
a processor coupled to the network interface unit, and configured to:
select a counter value that is part of a security association, wherein the counter value is selected from a range of counter values and a maximum size value of the range of counter values is based on a number of bits in the counter value;
determine whether the counter value is lower than the maximum size value;
in response to determining that the counter value is lower than the maximum size value, determine a Security Parameter Index ("SPI") value as a key value;
send the key value together with the security association to a plurality of routers that are part of a virtual private network such that the plurality of routers are able to exchange encrypted packets with each other in the virtual private network using the key value and the security association; and
increment the counter value to a value within a range of counter values capable of being predicted by the plurality of routers that receive the key value.

12. The apparatus of claim 11, wherein the processor is further configured to send the key value to one or more of the plurality of routers that is part of the virtual private network to enable at least one router that is part of the virtual private network, but that has not received the key value, to determine the key value.

13. The apparatus of claim 11, wherein the processor is further configured to send an updated security association with the incremented counter value to the plurality of routers that are part of the virtual private network.

14. The apparatus of claim 13, wherein the processor is further configured to:
receive a request from one or more of the plurality of routers for the updated security association; and
provide the updated security association to the one or more of the plurality of routers in response to the request.

15. A non-transitory processor readable medium storing instructions that, when executed by a processor, cause the processor to:
select a counter value that is part of a security association, wherein the counter value is selected from a range of counter values and a maximum size value of the range of counter values is based on a number of bits in the counter value;
determine whether the counter value is lower than the maximum size value;
in response to determining that the counter value is lower than the maximum size value, determine a Security Parameter Index ("SPI") value as a key value;
send the key value together with the security association to a plurality of routers that are part of a virtual private network, such that the plurality of routers are able to exchange encrypted packets with each other in the virtual private network using the key value and the security association; and
increment the counter value to a value within a range of counter values capable of being predicted by the routers that receive the key value.

16. The processor readable medium of claim 15, wherein the instructions are further operable to cause the processor to send the key value to one or more of the plurality of routers that is part of the virtual private network to enable at least one router that is part of the virtual private network, but that has not received the key value, to determine the key value.

17. The processor readable medium of claim 15, wherein the instructions are further operable to cause the processor to send an updated security association with the incremented counter value to the plurality of routers that are part of the virtual private network.

18. The processor readable medium of claim 17, wherein the instructions are further operable to cause the processor to:
receive a request from one or more of the plurality of routers for the updated security association; and
provide the updated security association to the one or more routers of the plurality of routers in response to the request.

* * * * *